Sept. 5, 1944.　　　　P. F. SCOFIELD　　　　2,357,771
FAN
Filed Nov. 18, 1942　　　　2 Sheets-Sheet 1

INVENTOR.
PHILIP F. SCOFIELD
BY
Frank H. Harmon
ATTORNEY

Sept. 5, 1944. P. F. SCOFIELD 2,357,771
FAN
Filed Nov. 18, 1942 2 Sheets-Sheet 2

INVENTOR.
PHILIP F. SCOFIELD
BY
ATTORNEY

Patented Sept. 5, 1944

2,357,771

UNITED STATES PATENT OFFICE 2,357,771

FAN

Philip F. Scofield, Cleveland Heights, Ohio, assignor to Jack & Heintz, Inc., Bedford, Ohio, a corporation of Ohio Application November 18, 1942, Serial No. 466,026

1 Claim. (Cl. 230—134)

This invention relates to a novel and improved air cooled armature construction for electric generators and the like.

The object of the invention is to provide an armature having an improved large diameter fan with collapsible impeller blades capable of insertion through an associated stator structure.

The invention may be best understood with reference to the accompanying drawings in which.

Figure 1:
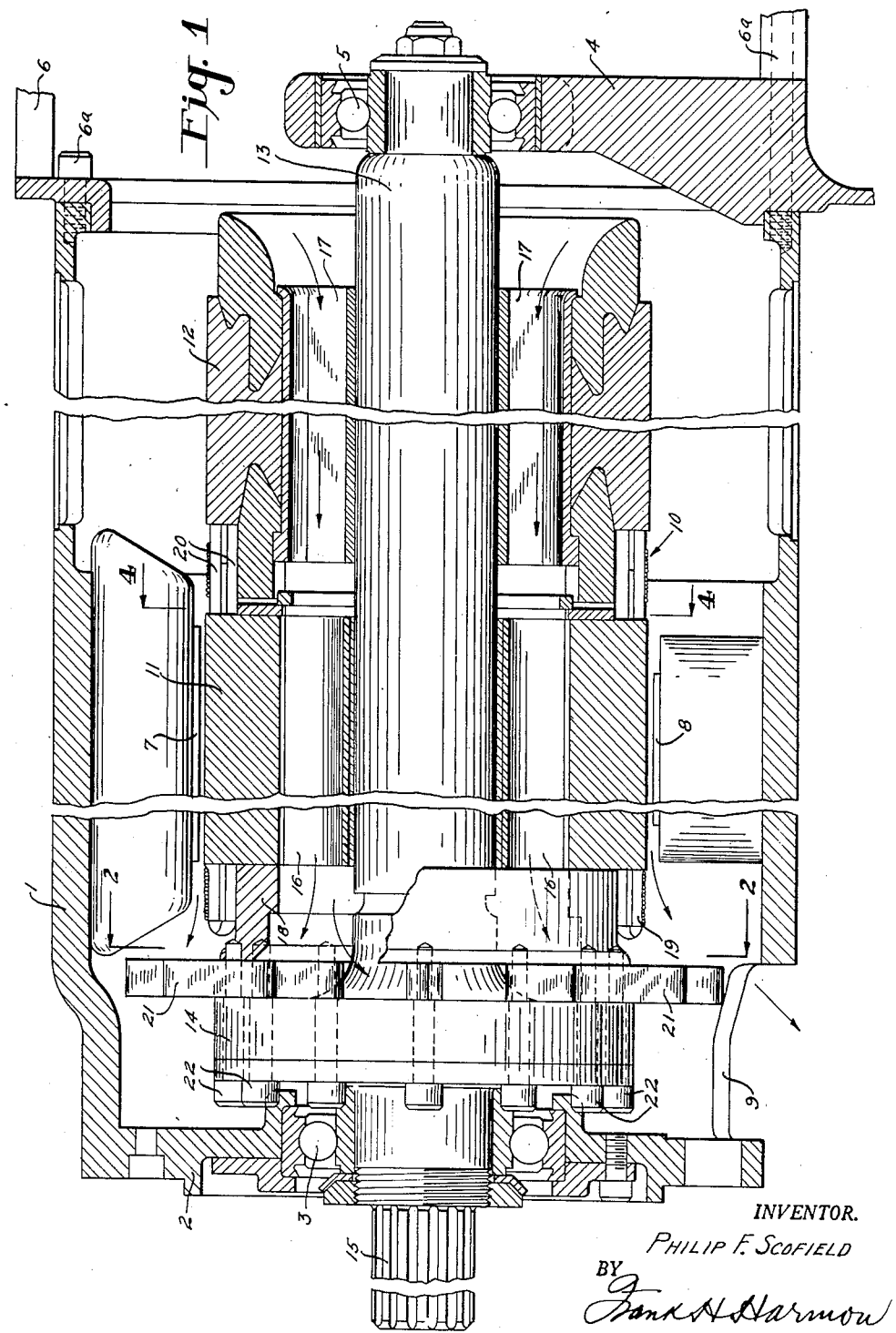
Figure 1 is a longitudinal sectional view of a generator embodying a cooling fan constructed according to the present invention.

The principles of the invention are illustrated in connection with a high output electric generator shown in longitudinal section in Figure 1. The numeral 1 indicates a generally cylindrical housing having an integral end wall 2 carrying an armature bearing 3. The other end of the housing 1 carries a spider, or spoked bearing support, 4 for an armature bearing 5, and an end member 6, broken away, these parts being secured to the housing by means of screws 6a or the like. Within the housing are shown a field pole 7 and interpole 8, it being understood that a plurality of such poles and interpoles are distributed in conventional manner around the interior of the housing. The side wall of the housing is cut away in a plurality of ventilating openings 9 adjacent the end wall 2.

The bearings 3 and 5 carry an armature designated generally by the numeral 10, said armature comprising a core 11 and commutator 12 mounted on a shaft 13. The shaft 13 is provided with an enlarged flange 14 and a splined driving end 15. Air passageways comprising a plurality of openings 16 in the core 11 and openings 17 in the commutator 12 provide for a longitudinal flow of cooling air through the central regions of the armature as shown by the arrows in Figure 1 to remove heat from this body.

Figure 4:
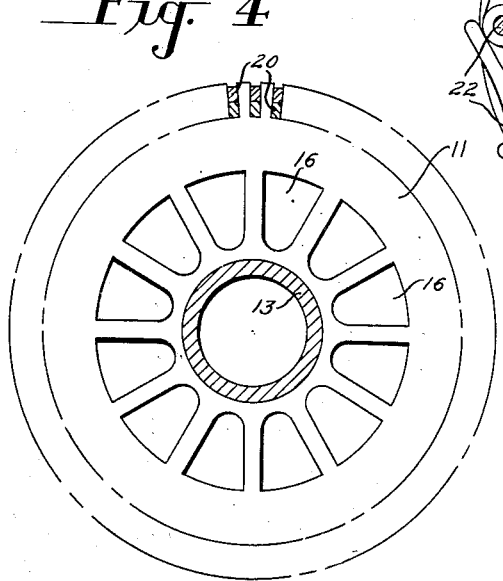
Figure 4 is a view taken on the line 4—4 of Figure 1, showing the air passageways through the armature.

This air flow, motivated by means to be presently described, enters around the bearing 5 and into the openings 17 from whence it passes into the openings 16 for discharge between the flange 14 and a ring 18 supporting the end turns 19 of armature conductors 20. Discharge of the air from this outwardly directed annular opening between flange 14 and ring 18 is effected by fan blades 21 pivotally mounted on special screws 22 which are carried by flange 14 and receive end support in the ring 18. In Figures 1 and 2 the fan blades are illustrated in extended positions approximately as they dispose themselves when the armature is rotating. Figure 4 illustrates the disposition of the air passages 16 through the core 11, for removing heat therefrom.

It will be seen that the above described construction provides a large diameter fan impeller of considerably greater effectiveness than if its outline were circumscribed by the size of the core 11. In operation heated air is discharged through the openings 9 around the housing and cool air is thereby drawn into the openings 17 at the commutator end of the armature. A movement of air is also induced between the armature and field structure as indicated by arrows.

Figure 2:
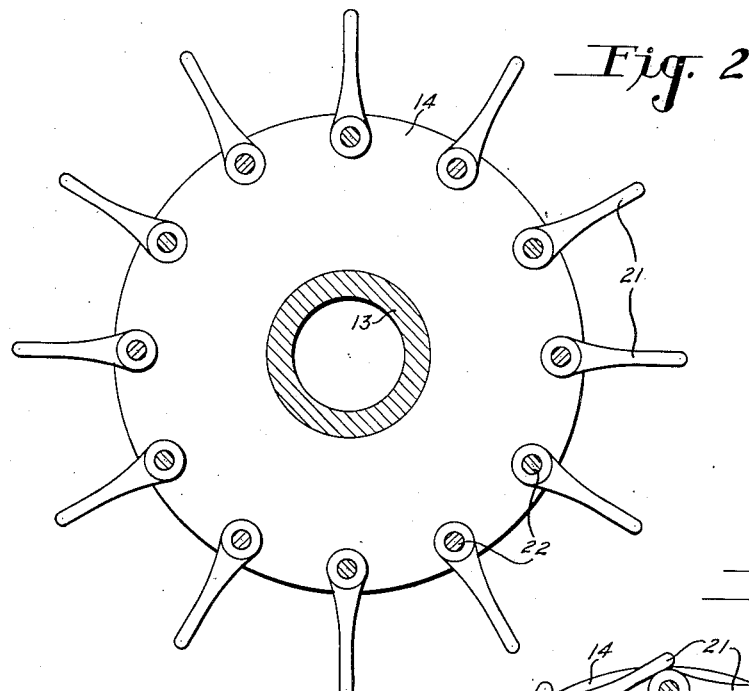
Figure 2 is a view taken on the line 2—2 in Figure 1, showing the fan blades extended.
Figure 3:
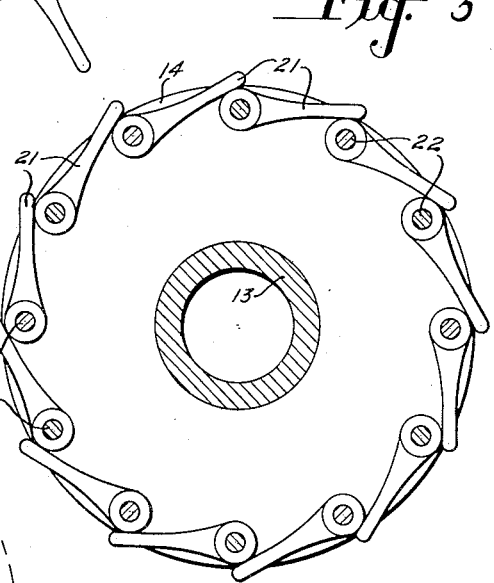
Figure 3 is a view taken as Figure 2 and showing the fan blades collapsed.

The armature is installed in the housing and field structure by insertion from the right hand end as viewed in Figure 1, since the end wall 2 is not removable. Figure 3 shows how the fan blades 21 are adapted to collapse in order to pass through the field structure. Rotation of the armature swings the blades outwardly to the approximate positions shown in Figure 2 for fan action.

If desired, the cooling effect may be enhanced by supplying air under pressure to the right hand end of the housing 1, but the present invention is concerned primarily with the above described novel fan means for establishing air circulation. By means of this circulation the heat generated in the armature of a high output generator is dissipated into the moving air stream and removed from the generator, thereby enabling higher output ratings for a given weight of iron and copper.

While the principles of the invention are illustrated in connection with an aircraft generator, they are also applicable to motors and other rotating machines. Various changes and modifications will occur to those skilled in the art and it is to be understood that all such variations are included in the invention. The invention is to be limited only by the appended claim and the scope of the prior art.

I claim:

Ventilating means for a housing having a restricted access opening for the installation thereof, comprising a rotor, a circular flange on said rotor perpendicular to the rotor axis and slightly smaller than said opening so as to be receivable therethrough, a plurality of relatively closely-spaced pivot elements on said flange near the periphery thereof, extending parallel to said axis, and impeller blades mounted for free pivotal action on said pivot elements so as to be extensible in operation in response to centrifugal force to sweep a circle substantially larger than said flange when said rotor is revolving, and retractable upon cessation of centrifugal force substantially within the outline of said flange for insertion and withdrawal through said access opening, said impeller blades having flat sides perpendicular to said flange for expelling air radially outwardly.

PHILIP F. SCOFIELD.